United States Patent [19]

Bonora et al.

[11] Patent Number: 4,628,803
[45] Date of Patent: Dec. 16, 1986

[54] AUTOCLAVE FOR PROCESSING COCOA LIQUOR

[75] Inventors: Benito Bonora, Milan; Ottorino Chiappa, Monza, both of Italy

[73] Assignee: Carle & Montanari S.p.A., Italy

[21] Appl. No.: 710,314

[22] Filed: Mar. 11, 1985

[30] Foreign Application Priority Data

Oct. 19, 1984 [IT] Italy ............................. 23241 A/84

[51] Int. Cl.[4] ............................................. B01F 7/16
[52] U.S. Cl. ...................................... 99/348; 99/472; 99/483; 99/516; 366/139; 366/144; 366/157; 366/295; 366/329
[58] Field of Search ................. 99/348, 451, 452, 453, 99/454, 467, 472, 477, 483, 485, 516, 534; 366/156, 157, 139, 144–146, 263, 265, 292, 293, 295, 296, 309, 329, 318, 349

[56] References Cited

U.S. PATENT DOCUMENTS 3,739,711  6/1973  Nieblach .............................. 99/348
3,754,466  8/1973  Taralli et al. ...................... 99/472 X
4,357,111  11/1982  Honemeyer et al. ................ 99/348

Primary Examiner—Timothy F. Simone
Attorney, Agent, or Firm—Kirschstein, Kirschstein, Ottinger & Israel

[57] ABSTRACT

An autoclave for processing cocoa liquor, wherein for the effectuation of all the processing steps of a cocoa liquor involved, additionally to inlet (5) and discharge ports for the product, heater means, stirrer means, and level and temperature (7) gages, there are provided an intake port (11a) for the infeed of water, treated roasting hot air, steam or process solution, in conjunction with a neutral gas intake port (11), a suction port (11b) for vacuum forming, a thermal treatment means (9) selectively associable with a source of a heated fluid or with a source of a cooling fluid, means (16,34) of conveying and centrifuging the mixture of product plus water or infeed solution, means (22) of dispersing the product in the form of a free-falling umbrella-like layer, and means (32,28,33) of displacing the product in opposite directions. The various steps may be carried out in succession, or at least partly simultaneously, and the same may include processing steps, such as conching, which could only be carried out hitherto in the course of subsequent treatments of chocolate.

The autoclave (1) thus affords a faultless chocolate product, as well as a decrease of the production time therefor and of energy consumption.

21 Claims, 2 Drawing Figures

AUTOCLAVE FOR PROCESSING COCOA LIQUOR

BACKGROUND OF THE INVENTION

This invention relates to an autoclave for processing cocoa liquor.

Cocoa liquor forms the starting or basic material in the production of chocolate. It is obtained by grinding cocoa seeds or beans, after separation from their pods which are known to include most of the bacterial load of cocoa beans. Several cocoa grades are commercially available which may vary even on account of such conditions as their areas of origin, season, climates, etc., and cocoa may have an impurity content which varies between lots. This requires that a plurality of processing steps be carried out both on the basic cocoa and cocoa granulate, or on the cocoa liquor formed therefrom, which are directed to provide a cocoa liquor as hygienically faultless as feasible and having the taste or organoleptic properties sought, possibly even where the starting cocoa happens to be of a poor grade.

It is current practice in the art to perform all the processing steps on a number of apparata or devices and in a continuous fashion. Thus, the processed product is more liable to non-uniform treatment due to irregular metering is to travel over transfer paths, and subjected to temporary contact with air, or oxygen contained therein, which may trigger oxidation reactions, etc. With conventional processes, moreover, the use of high temperatures is disadvantageous, e.g. during roasting or drying, which may jeopardize the taste properties of the chocolate then formed. Furthermore, prior processes involve a high energy consumption and very expensive equipment.

Attempts made with fast pasteurizers have failed to give satisfactory results, because they do not permit for the use of the relatively high temperatures that would be required.

In the course of subsequent stages of cocoa liquor processing, that is during the mixing, refining, and above all conching stages, chocolate may be subjected to additional treatment, such as aromatization during conching, in order to bring it as close as possible to a desired taste. Such additional treatments generally require prolonged treatment periods, and consequent increased energy consumption and, once again, high equipment investment costs. Further, transference of the product for treatment through several apparata involves disadvantages and the availability of labor and equipment for both taking care of such transference and monitoring performance of the various steps.

SUMMARY OF THE INVENTION

A basic object of this invention is to provide an autoclave of improved design which can provide for the in situ completion, on a single apparatus, of the various processing steps envisaged for the cocoa liquor prior to the mixing step, and specifically, optionally in succession or at least in part simultaneously, as well as of other processing steps hitherto performed at successive stages, such as an aromatization, to thereby provide a faultlessly homogeneous product having characteristics sought for and which can be obtained at faster rates for an energy expenditure which is greatly reduced.

In an autoclave having an autoclave body, an intake port for the product to be processed with its associated loading means, a discharge port for the processed product with its associated unloading means, a heater means, power driven stirrer means, and a level gage and thermostat sensor, the object underlying this invention is achieved by that the autoclave is characterized by the provision of:

i. a port for the infeed of water, steam, a process solution, or the like;
ii. a suction, or vacuum formation, port which also serves as a steam exhaust port;
iii. a neutral gas intake port;
iv. means of conveying and centrifuging the mixture including the product plus water, additional solution, steam, or the like, as well as roasting hot air;
v. a means of thermal treatment alternately and selectively associable with a heating fluid and cooling fluid;
vi. a means of displacing the product in opposite directions; and
vii. a means of dispersing the product in the form of a thin layer of free-falling umbrella-like droplets.

The autoclave herein proposed affords, inter alia, the following advantages:

any transference of the cocoa liquor is avoided, thereby any oxidation or contamination thereof by contact with air or bacterially contaminated environments can be prevented;
absolute accuracy is ensured of preset dosages;
all of the envisaged processing steps can be carried out in situ, either in succession or in part simultaneously, thus eliminating any allowance of time and means for transferring the product;
the cocoa liquor can be subjected to treatments which could only be applied hitherto at some subsequent stages, e.g. during conching, like for example an aromatization directed to adjust the taste of the cocoa liquor;
cocoa liquors of a good satisfactory quality can be obtained in spite of the basic cocoa grade being an inferior one;
the overall processing time of the chocolate production cycle can be effectively shortened;
by working the product in one and the same environment, the different process parameters, such as temperature, process medium, heating/cooling cycles, etc., can be set and maintained as actually sought without assuming any of the transfer downtime involved in traditional methods;
a cocoa liquor, viz. a final chocolate, is obtained which has faultless homogeneity and uniformity characteristics;
it becomes possible to do without the equipment and labor otherwise required for transferring as usual the product between apparata;
the resulting product has a taste without blemish, quite unaffected by the "taste of metal" which is so often encountered after treatments on conventional equipment of the thin layer scraping type, or of the type providing for fretting over the container wall.

BRIEF DESCRIPTION OF THE DRAWINGS

Further features, advantages and details of the autoclave according to the invention will be more clearly understood from the description which follows, in conjunction with the accompanying drawings, which show diagramatically a preferred embodiment of an autoclave for the continuous processing of cocoa liquor in accordance with the teachings of this invention.

In the drawings, which illustrate schematically and on different scales the invention for clarity reasons.

DESCRIPTION OF THE PREFERRED EMBODIMENT

Figure 1:
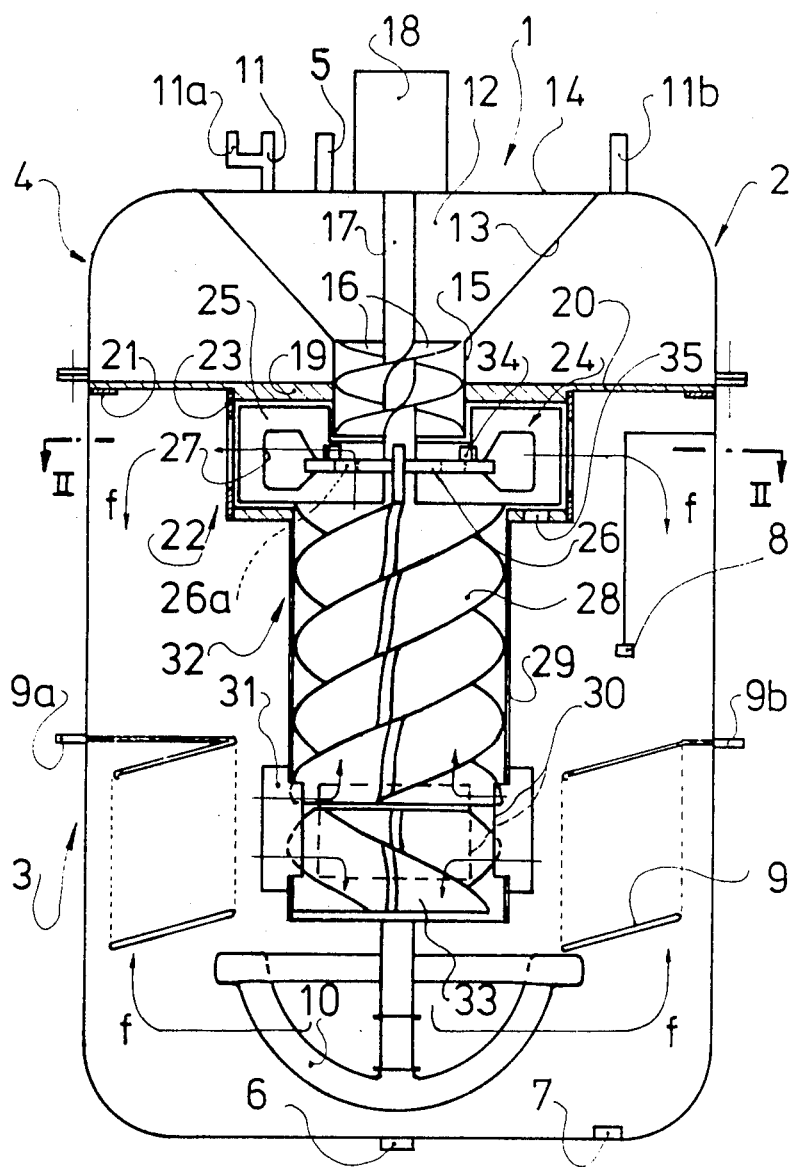
FIG. 1 is a substantially middle vertical section view taken through an autoclave according to this invention.

With reference to the drawing views, where similar parts are identified with the same reference characters, the autoclave is generally indicated at 1. The same includes an autoclave body 2 having a lower portion 3 and an upper portion 4. Indicated at 5 is an inlet port for the cocoa liquor to be processed, and at 6 a discharge port for the processed cocoa liquor. Respectively indicated at 7 and 8 are a thermostat sensor and level gage. As the heating and cooling means, there is provided a concentric coil, diagrammatically shown at 9, which has an inlet end 9a and an outlet end 9b whereto suitable sources of heating and cooling media or fluids, not shown, can be connected.

A power driven stirrer means 10, as explained hereinafter, is also provided within the autoclave.

It is in such an autoclave environment that the invention is operative to enable effectuation of the various processing steps envisaged in situ, optionally in succession or in part simultaneously, by providing an autoclave improved design as explained herein below, whereby the cocoa liquor can be advantageously processed in the form of drops which arrange themselves umbrella-like, or to fall down by gravity without rubbing contact with the autoclave inner wall.

According to the invention, therefore, there are provided an intake port 11 for a neutral gas and an infeed port 11a for the introduction of either water or steam or sterile filtered air as roasting hot air, or depending on requirements, of a process solution, as well as a suction port 11b, said ports 11 and 11a as well as said inlet port 5 opening into a chamber 12 defined by a supporting structure 13 of substantially funnel-like configuration, which is attached at the top to the ceiling 14 of the autoclave 1 and has at the bottom a cylindrical stub pipe 15. Accommodated therein are augers 16 made fast to a throughgoing shaft 17 which extends through the ceiling 14 of the autoclave 1 and is associated therein with a drive means diagrammatically indicated at 18. As may be seen in FIG. 1, the shaft 17 carries, at its bottom end, the cited stirrer means, indicated at 10 and having advantageously a substantially semicircular configuration, or anchor-like shape, provided of preference with four arms at 90° from each other.

Figure 2:
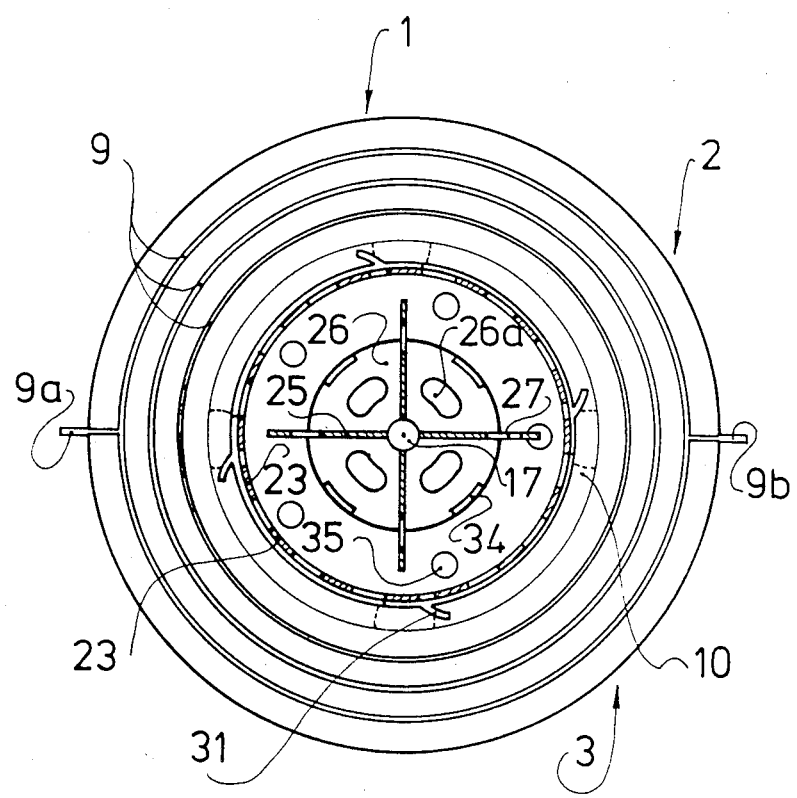
FIG. 2 shows a cross-sectional view taken along the line II—II in FIG. 1.

Indicated at 19 is a supporting and centering disc which, being associated with the stub pipe 15, and with the intermediary of arms 20, is carried on specially provided supports 21 attached to the autoclave inner wall. That disc also provides support for the disperser, generally indicated at 22. It includes an outer cylinder 23, in the form of a perforated cage, wherein a rotor 24 is set movable which comprises, in the example shown, four paddles 25 set at 90° from each other. The latter are attached to the shaft 17 and to one another, respectively by means of a segment 26 extending approximately over a quarter of a circle, as clearly shown in FIG. 2. Each segment 26 is formed with a throughgoing port 26a. Indicated at 27 is a respective port in each paddle 25. A helix or auger 28 is associated with the bottom of each paddle 25. Said augers 28 are housed within a downwardly extending shroud 29 and have throughgoing apertures formed in their lower portions. As an example, four such juxtaposed apertures would be provided having a peripheral length only slightly smaller than 90°, the same being indicated at 30. To the strip-like surfaces of the shroud between said apertures 30, there is respectively attached a fixed guide element, indicated at 31. The augers 28 form the upper section of a device for displacing the product in opposite directions, as generally indicated at 32. The reference numeral 33 designates augers forming the lower portion of the displacement device 32, the same winding counter to to the upper augers 28.

Indicated at 34 are strips, for example four in number, provided between the disc segments 26 whereto they are fastened, and the adjacent end of the stub pipe 15, slightly short of which they are terminated, whilst at 35 there are indicated throughgoing ports in the bottom of the cylinder 23.

The autoclave operation may be appreciated in the light of the foregoing constructional description.

Water, steam, or a selected alkaline solution are fed in through the port 11 and flow first into the chamber 12 and then, through the augers 16, onto the underlying disc segments 26. By means of the strips 34, the product plus water or solution mixture is centrifuged outwardly, that is onto the cocoa liquor which, under the upward thrust imparted by the augers 28, will flow through the ports 27 and 26a and centrifuged outwards by the rotating paddles 25 through the mesh cylinder 23 in the form of an umbrella-like free falling film. The augers 16, additionally to directing the infeed water or solution, also function to prevent the cocoa liquor from upflowing back into the chamber 12. Thereafter, a mixing process takes place in the disperser of the water or alkaline solution and cocoa liquor, along with, as mentioned previously, a distribution of the same by centrifugation in the form of a thin umbrella-like free falling layer. The lower portion of the opposite direction displacement device 32 serves the purpose of forcing the cocoa liquor toward the autoclave bottom, where its mixing takes place by means of the stirrer 10. The cocoa liquor present in the autoclave is then displaced, in a continuous cycle, through the ports 30 toward the interior of the device 32, and from there partly upwards and partly downwards, as indicated by the arrows f. The stirrer 10 is specifically operative to impart to the cocoa mass at the bottom of the autoclave a rotary and ascending motion across the autoclave inner wall. Such movements imparted to the cocoa liquor enable the heat exchange between the coil 9 and product to be optimized. The guiding or directing elements 31 will favor conveyance of the cocoa liquor mass through the apertures 30 toward the interior of the displaying device 32, and to this aim, they are given an approximately tangential pattern relatively to the surface of the shroud 29. The latter, as shown, is terminated slightly below the bottom side of the apertures 30.

A detailed description of the system parts for operating the autoclave, such as feed pumps, exhaust pumps, vacuum pumps, etc., has been omitted herein because such arrangements are foreign to this invention and may be of any conventional types.

By way of illustration, an example is given now of the processing steps which may be carried out on a cocoa liquor using an autoclave according to the invention.

After loading with a preset amount of cocoa liquor, a deep vacuum is drawn followed by formation of a surely non-oxidizing atmosphere, e.g. by admitting carbon dioxide, nitrogen, or any other neutral gas. Thereupon, the cocoa liquor may be heated by flowing a hot fluid through the coil 9, with the simultaneous introduction of the alkaline solution, water, or steam provided for humidification and subsequent deacidification of the cocoa liquor. It would also be advantageously possible to use a reducing sugar solution serving for the aromatization step. This may be followed by a pasteurization or sterilization step, through fast heating of the cocoa liquor. Alternatively, an optional roasting step may also be carried out. This would be accomplished by the use of sterile filtered air, the temperature whereof would be appropriately selected and controlled by means of some well known arrangement no further illustrated herein. This is followed by draining the water added out. By the use of the vacuum system provided, the cocoa liquor may be advantageously chilled. Then the pasteurization/sterilization step may be carried out more easily by further chilling the cocoa liquor, e.g. by flowing through the coil a cold fluid, such as having a water or glyco-solution content. At this stage, the cocoa liquor may be either discharged or taken directly to a successive processing step.

It may be appreciated from the foregoing that the proposed autoclave effectively achieves the object set forth for the invention, and that the advantages outlined in the preamble are obtained. In particular, the sequence of the operations to be carried out can be preset as desired, and the parameters of the processing cycle can be set in an extremely easy manner to ensure in all circumstances absence of any oxidizing conditions due to contact with air, or oxygen, especially during the heat application steps. Where a cocoa roasting step is envisaged, treated, i.e. filtered and sterile, air is used. According to the invention, in fact, such prior disadvantages are obviated not only because transference of the material between apparata having untreated ambient air, is avoided, but also because, by working at all times in situ, it becomes feasible to provide an inert working medium in a simple and effective way. By dispersing the liquor in the form of umbrella-like droplets, one can be assured of the liquor not being imparted an undesired metal taste. By arranging for the direct effectuation on the cocoa liquor of processing steps otherwise to be carried out on chocolate, such as the aromatization step, currently performed in a conch, this processing time at the conch, which is notoriously time-consuming and expensive in terms of energy input, may be approximately halved. In practice, it has been found that with the proposed autoclave, optimum results of "adjustment" of the poor characteristics exhibited by a basic cocoa of inferior quality, either on account of its origin or because of faults in its initial conversion, can be achieved.

The individual parts of the proposed autoclave may be replaced with technical and/or functional equivalents, and it would be possible to select at will the number, pitch, or configuration of the augers, etc. without departing from the protection scope of the invention.

All of the features to be derived from this specification, appended claims, and the drawings are to be regarded as substantial to this invention, either individually or in any combination thereof.

We claim:

1. In an autoclave for processing cocoa liquor, an arrangement comprising:
   (a) a processing vessel having an inner circumferential wall bounding an interior;
   (b) inlet means for admitting cocoa liquor into the vessel for processing;
   (c) vacuum means for exhausting contaminants from within the vessel;
   (d) thermal means in the vessel for thermally treating the cocoa liquor within the vessel;
   (e) stirrer means for stirring the cocoa liquor, including a drive shaft within the vessel and extending along a longitudinal axis, and a drive exteriorly of the vessel and operative for turning the shaft;
   (f) means for introducing a treatment fluid into the vessel for admixture with the cocoa liquor, said introducing means including conveying means on, and turnable with, the drive shaft, for conveying the treatment fluid along a flow path in one axial direction;
   (g) moving means on, and turnable with, the drive shaft, for moving the cocoa liquor along a flow path in an opposite axial direction which is countercurrent to said one axial direction; and
   (h) dispersing means located in the flow paths of said conveying means and said moving means, and mounted on, and turnable with, the drive shaft, for mixing the treatment fluid and the cocoa liquor, and for dispersing the resultant mixture of treatment fluid and cocoa liquor under centrifugal action in free air in generally radially outward directions toward the inner circumferential wall of the vessel and allowing the mixture to fall freely in the interior of the vessel under the influence of gravity in an umbrella-like dispersion pattern.

2. The arrangement as recited in claim 1, wherein the processing vessel is upright, and wherein the drive shaft extends vertically from the drive into the vessel.

3. The arrangement as recited in claim 1, wherein the thermal means includes a hollow coil concentrically surrounding the drive shaft within the vessel, said hollow coil having means for passing a flowable medium having a desired thermal characteristic through the coil in heat exchanging relationship with the cocoa liquor.

4. The arrangement as recited in claim 2, wherein the stirrer means includes blade means on, and turnable with, the drive shaft adjacent a bottom wall of the vessel, said blade means being operative for directing the cocoa liquor in the region of the bottom wall in generally radially outward directions toward the inner circumferential wall in directions generally away from the bottom wall.

5. The arrangement as recited in claim 2, wherein the vessel includes an infeed chamber to which the cocoa liquor and the treatment fluid are fed, and an infeed tube in fluid communication with the infeed chamber and extending along the longitudinal axis; and wherein the conveying means includes auger means within the infeed tube and having helical threads extending helically in a predetermined circumferential sense about the drive shaft, for conveying the cocoa liquor and the treatment fluid along said one axial direction downwardly to the dispersing means.

6. The arrangement as recited in claim 5, wherein the vessel includes a tubular shroud within the vessel and extending along the longitudinal axis; and wherein the moving means includes screw means within the tubular shroud and having helical threads extending helically in a different circumferential sense opposite to said predetermined sense about the drive shaft, for conveying the cocoa liquor and the treatment fluid along said opposite axial direction upwardly to the dispersing means.

7. The arrangement as recited in claim 6, wherein the auger means is simultaneously operative with the screw means, for preventing upwardly conveyed cocoa liquor and treatment fluid from being conveyed upwardly through the infeed tube.

8. The arrangement as recited in claim 5, wherein the introducing means includes means for inletting an inert carrier medium for carrying the treatment fluid into the vessel.

9. The arrangement as recited in claim 6, wherein the vessel includes an apertured cylinder within the vessel and concentric with the longitudinal axis, said cylinder having an upper axial end region in fluid communication with the infeed tube, a lower axial end region in fluid communication with the tubular shroud, and a side wall bounding an inner space having radial apertures extending radially therethrough from the inner space of the cylinder to the interior of the vessel; and wherein the dispersing means includes a blade assembly within the inner space of the cylinder, and operative for directing the mixture through the radial apertures to form said umbrella-like pattern.

10. The arrangement as recited in claim 9, wherein the blade assembly includes a plurality of blades mounted at the outer ends of arms fixed to, and equiangularly spaced about, the drive shaft; and wherein the arms have axially-extending openings extending therethrough, and mixer elements mounted on the arms to intensify the dispersing action.

11. The arrangement as recited in claim 9, wherein the apertured cylinder has a bottom wall formed with axial apertures extending therethrough axially from the inner space of the cylinder to the interior of the vessel.

12. The arrangement as recited in claim 6, wherein the screw means is mounted within an upper section of the shroud; and further comprising auxiliary screw means within a lower section of the shroud, and having helical threads extending helically in said predetermined sense about the drive shaft, for conveying the cocoa liquor and treatment fluid along said one axial direction downwardly away from the screw means within the upper section of the shroud.

13. The arrangement as recited in claim 12, wherein the shroud has side openings for admitting cocoa liquor and treatment fluid to both the upper screw means and the lower auxiliary screw means, and means adjacent the side openings for guiding the cocoa liquor and treatment fluid therethrough.

14. The arrangement as recited in claim 9, wherein the vessel has an upper body portion removably mounted on a lower body portion and having a top wall, and wherein the drive is mounted on the top wall; and wherein the drive shaft successively extends through the top wall, infeed chamber, infeed tube, apertured cylinder, and tubular shroud and terminates in the stirrer means.

15. The arrangement as recited in claim 1, wherein the treatment fluid is roasting hot air.

16. The arrangement as recited in claim 6, wherein the treatment fluid is water.

17. The arrangement as recited in claim 1, wherein the treatment fluid is steam.

18. The arrangement as recited in claim 1, wherein the treatment fluid is a process solution.

19. The arrangement as recited in claim 1; and further comprising outlet means for discharging the processed cocoa liquor.

20. The arrangement as recited in claim 1; and further comprising level gauge means within the vessel for monitoring the level of the mixture therein.

21. The arrangement as recited in claim 1; and further comprising means within the vessel for monitoring the temperature of the mixture therein.

* * * * *